Figure 2:
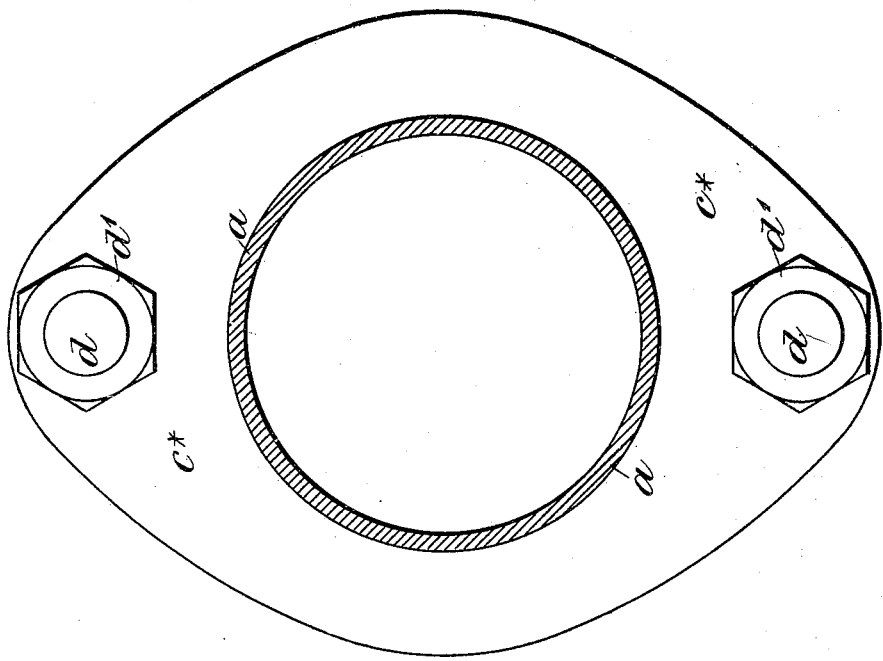

(No Model.)

J. AIRD.
JOINT OR COUPLING FOR METALLIC PIPES OR TUBES.

No. 478,496. Patented July 5, 1892.

Attest
Geo. E. Cruse,
S. Cotton

Inventor
Joseph Aird.
by Knight Bros
Atty's.

THE NORRIS PETERS CO., PHOTO-LITHO., WASHINGTON, D. C.

UNITED STATES PATENT OFFICE.

JOSEPH AIRD, OF TIPTON, ENGLAND.

JOINT OR COUPLING FOR METALLIC PIPES OR TUBES.

SPECIFICATION forming part of Letters Patent No. 478,496, dated July 5, 1892.

Application filed March 11, 1891. Serial No. 384,553. (No model.) Patented in England October 23, 1890, No. 16,896; in France February 25, 1891, No. 211,703; in Belgium February 25, 1891, No. 93,924, and in Germany February 25, 1891, No. 58,452.

*To all whom it may concern:*

Be it known that I, JOSEPH AIRD, manufacturer of iron and steel tubes, a subject of the Queen of Great Britain, residing at Wellington Tube Works, Great Bridge, Tipton, in the county of Stafford, England, have invented a new or Improved Joint or Coupling for Metallic Pipes or Tubes, (for which I have obtained Letters Patent in Great Britain, No. 16,896, dated October 23, 1890; in France, No. 211,703, applied for February 25, 1891, and issued June 5, 1891; in Belgium, No. 93,924, applied for February 25, 1891, and issued March 16, 1891, and in Germany, No. 58,452, applied for February 25, 1891, and issued August 27, 1891;) and I do hereby declare that the following is a full, clear, and exact description of the invention, which will enable others skilled in the art to which it appertains to make and use the same.

My invention relates to a new or improved joint or coupling for metallic pipes or tubes, and has for its object to obtain a simple form of joint which will be less costly to produce, easier to connect, and which will withstand greater pressure than heretofore. For this purpose I form upon the exterior of each of the meeting ends of the two sections or lengths of the pipe or tube to be connected together a broad flange or collar, and I form in the adjacent or meeting faces of each of the flanges or collars a channel or groove for the reception of asbestos or other suitable packing, or in some cases I might dispense with the groove or channel in one or both of such faces, while still retaining the packing.

Upon each section of the tube I place a loose clamping-collar, which takes an abutment against the collar or flange of the tube, and at suitable positions around the clamping-collars I form holes for the reception of headed bolts, which at their opposite ends are threaded and fitted with nuts, by the aid of which the parts may be forced together. One of the clamping-collars is formed with an annular flange thereon, which covers the joint formed by the adjacent or meeting faces of the flanges or collars of the tubes, and thus renders it impossible for the packing to blow out, and the other of such clamping-collars is formed to overlap or receive the flange of the other of such clamping-collars, so as to form a broad bearing to these parts, and thus efficiently guide them in their movements. Upon screwing up the nuts the adjacent or meeting faces of the collars or flanges of the tubes will be forced together, compressing between them the packing within the groove or channel, and the clamping-collars will cover the joint and firmly bind the parts together, thus making a perfectly-tight joint capable of withstanding great pressure.

In order that the said invention may be more clearly understood and readily carried into effect, I will proceed, aided by the accompanying drawings, more fully to describe the same.

Figure 1:
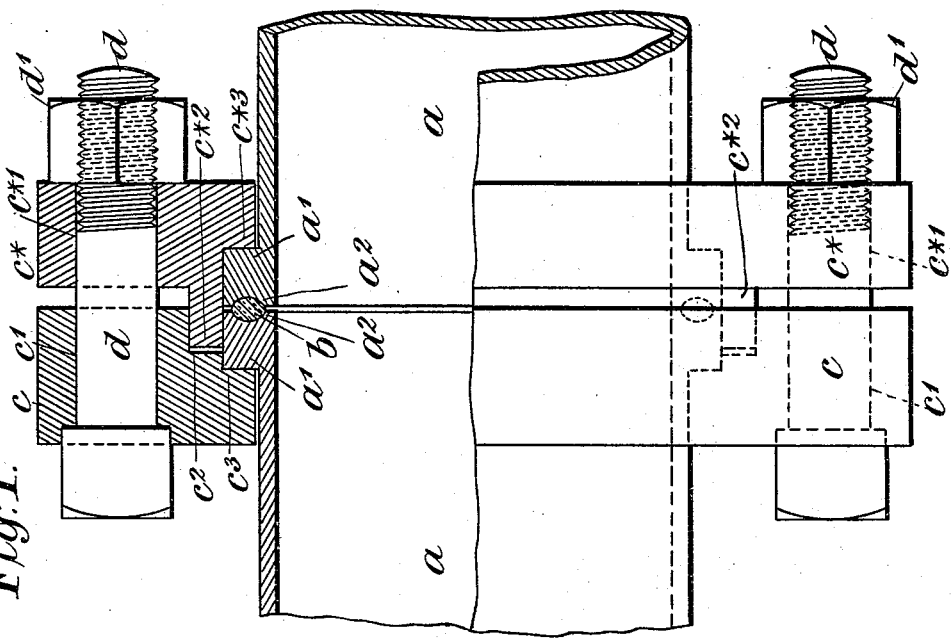

In the drawings, Figure 1 is a longitudinal view, partly in section, representing portions of two lengths of pipe or tube united by means of my invention; and Fig. 2 is an end view thereof.

$a$ represents portions of two lengths or sections of pipe or tube, upon the exterior of the meeting ends of which is formed a broad flange or collar $a'$, and in the adjacent or meeting faces of each of these flanges or collars $a'$ is formed an annular channel or groove $a^2$, in which is placed a ring of asbestus or other suitable packing $b$; or, if desired, the groove or channel $a^2$ in one or both of such faces may be dispensed with, while still retaining the packing, as will be readily understood.

Upon each length or section $a$ of the tube or pipe is placed a loose clamping-collar $c\ c^*$, which takes an abutment against the collar or flange $a'$ of its respective length or section $a$ of tube and at suitable positions around the clamping-collars $c\ c^*$. Holes $c'\ c^{*\prime}$ are formed for the reception of headed bolts $d$, which at their opposite ends are threaded and fitted with nuts $d'$, which bear against the face of the clamping-collar $c^*$, and by the aid of which the clamping-collars $c\ c^*$, and consequently the two lengths or sections $a$ of pipe or tube, may be forced together, thereby tightly compressing the ring of asbestus or other packing $b$ between them. That one $c^*$ of the clamping-collars is formed with an annular flange $c^{*2}$ thereon, which covers the joint formed by the adjacent or meeting faces of the flanges or collars $a'$ of the two sections or lengths of tube $a$, and thus renders it impossible for the ring of packing $b$ to blow out, while the clamping-collar $c^*$ is recessed or formed with a shoulder $c^{*3}$, which takes the necessary abutment against the flange or collar $a'$ of the length of tube $a$. The other one $c$ of the clamping-collars is formed with annular recesses $c^2 c^3$, the latter being deeper than the former. The outer wall of the recess $c^3$ extends around and overlaps the outer edge of one of the fixed flanges $a'$, so as to form, substantially, a continuation of the flange $c^{*2}$, while the outer wall of the recess $c^2$ extends around and overlaps the outer edge of the flange $c^{*2}$. These parts are thus provided with broad bearing-surfaces which guide them in their movements, and being lap-jointed leakage is effectually prevented. Upon screwing up the nuts $d'$ the adjacent or meeting faces of the collars or flanges $a'$ of the lengths or sections $a$ of tube or pipe will be forced together, thereby compressing between them the ring $b$ of packing lying within the grooves or channels $a^2$, and the clamping-collars $c\ c^*$ will cover the joint and firmly bind the parts together, thus making a perfectly-tight joint capable of withstanding great pressure.

I would have it understood that in lieu of the holes $c'\ c^{*\prime}$ in the clamping-collars $c\ c^*$ I may employ open-ended slots, and thus facilitate the putting together of the parts, and with the same object I may employ other means than the bolts and nuts $d\ d'$ for forcing the clamping-collars together, and I may form the flanges $a'$ and clamping-collars $c\ c^*$ of other shapes than those shown in the accompanying drawings. By these means I am enabled to dispense with the costly screw-coupling hitherto employed for joining together two lengths of pipe or tube, and by reason of the elements of my coupling being of a very simple character, and therefore easily produced, I attain the desired end with considerably less expense.

Another important advantage of my invention is that two lengths of pipe or tube may be securely coupled in a much shorter space of time than by means of the screw-coupling hitherto employed.

Having now particularly described and ascertained the nature of my said invention and in what manner the same is to be performed, I declare that what I claim is—

A joint or coupling for metallic pipes or tubes, consisting of a fixed flange or collar upon each of the lengths of pipe to be connected, an annular groove formed in one or both of such flanges, a ring of packing material located in the groove, two loose clamping-collars abutting against the flanges of the tubes, one being provided with an annular flange $c^{*2}$, arranged around the exterior of the said fixed flanges and projecting beyond the packing and the opening between said fixed flanges and the other of said clamping-collars being formed with annular recesses $c^2\ c^3$, the latter being deeper than the former and its outer wall being extended around and overlapping the outer edge of one of the fixed flanges $a'$, so as to form, substantially, a continuation of the flange $c^{*2}$, and the outer wall of the recess $c^2$ being extended around and overlapping the outer edge of the flange $c^{*2}$, and means for forcing such clamping-collars together, substantially as herein shown and described.

JOSEPH AIRD.

Witnesses:
ERNEST HARKER,
 *Clerk, U. S. Consulate.*
CHR. I. BIN,
*Wellington Tube Works, Gt. Bridge, Staffordshire.*